United States Patent [19]

Kiley et al.

[11] Patent Number: 5,449,213

[45] Date of Patent: Sep. 12, 1995

[54] MOVABLE BODY PANEL FOR A VEHICLE AND RELATED METHOD

[75] Inventors: Matthew P. Kiley, Pittsburgh; Dinesh C. Seksaria, Murrysville; Richard A. Sokol, Harrison City, all of Pa.

[73] Assignee: Aluminum Company of America, Pittsburgh, Pa.

[21] Appl. No.: 66,574

[22] Filed: May 26, 1993

[51] Int. Cl.6 .......................... B60J 5/10; B62D 25/24
[52] U.S. Cl. ...................................... 296/56; 296/146.5
[58] Field of Search ............. 296/56, 76, 146.5, 146.6, 296/148, 187, 195, 202, 205

[56] References Cited

U.S. PATENT DOCUMENTS

| | | | |
|---|---|---|---|
| 2,682,427 | 6/1954 | Bright | 296/148 |
| 3,163,463 | 12/1964 | Femrite | 296/56 X |
| 3,680,910 | 8/1972 | Stanner . | |
| 4,070,056 | 1/1978 | Hickman | 296/148 |
| 4,751,395 | 6/1988 | Centofanti | 296/56 |
| 4,799,730 | 1/1989 | Harasaki . | |
| 4,822,098 | 4/1989 | Vogt et al. . | |
| 4,845,894 | 7/1989 | Herringshaw et al. | 296/146.5 X |
| 4,858,981 | 8/1989 | Post | 296/76 |
| 4,880,267 | 11/1989 | Ohya . | |
| 5,102,186 | 4/1992 | Yoshii et al. . | |
| 5,244,745 | 9/1993 | Seksaria et al. | 52/792 X |

FOREIGN PATENT DOCUMENTS

| | | | |
|---|---|---|---|
| 39071 | 11/1981 | European Pat. Off. | 296/205 |
| 336781 | 10/1989 | European Pat. Off. | 296/205 |

*Primary Examiner*—Dean Kramer
*Attorney, Agent, or Firm*—George K. Stacey; Thomas R. Trempus

[57] ABSTRACT

A movable body panel for a vehicle is provided. The body panel includes a load bearing frame member made from an elongated hollow beam member. Inner and outer panels are secured to one another with the frame member disposed between the panels and secured to the inner panels. Hinges are secured to the frame member and the vehicle for permitting movement of the body panel relative to the remainder of the vehicle. A method of making the body panel is also provided.

27 Claims, 4 Drawing Sheets

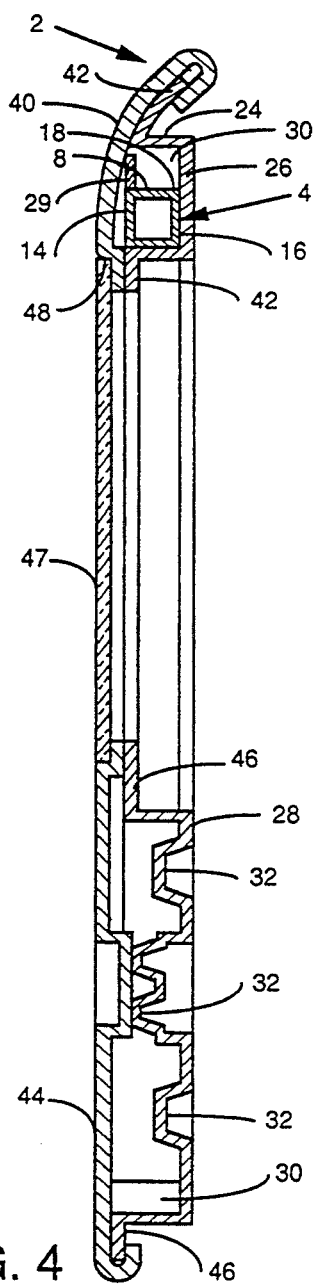
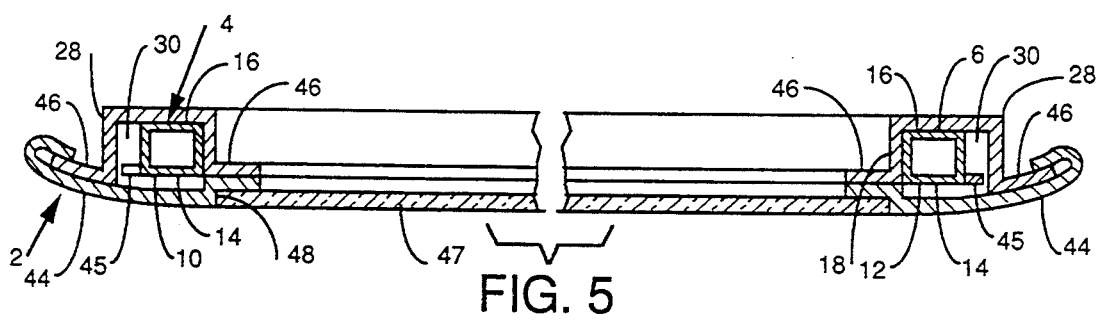
FIG. 4
FIG. 5

MOVABLE BODY PANEL FOR A VEHICLE AND RELATED METHOD

BACKGROUND OF THE INVENTION

1. Field of the Invention

This invention relates generally to vehicle body panels, and more particularly, to movable body panels, such as doors, liftgates, hatches and the like.

2. Discussion of Related Art

Movable body panels for vehicles are typically made of sheet steel. Panels form closures for openings in the vehicle body. The sheets of the panel perform load bearing functions as well as ornamental functions. While steel sheets provide adequate strength in the panels, such panels are relatively heavy. In addition, corrosion caused by moisture, road salt and the like may deteriorate the integrity of the steel.

Relatively recently, body panels for vehicles have been made from thermoplastic materials. Such panels are typically lighter than steel panels. However, they do not always provide the desired rigidity and strength. In addition, such materials may be more costly than steel and may result in an inferior surface finish.

Examples of various constructions for body panels for vehicles are shown in U.S. Pat. Nos. 3,680,910; 4,799,730; 4,822,098; 4,880,267; and 5,102,186. U.S. Pat. No. 3,680,910 discloses a vehicle body closure panel formed from an inner panel and outer panel joined together by hem tanging the edge portions thereof. U.S. Pat. No. 4,799,730 discloses a movable tailgate for a vehicle having taillights mounted thereon. U.S. Pat. No. 4,822,098 discloses a double-walled plastic structural body panel for a vehicle. U.S. Pat. No. 4,880,267 discloses a back door for a motor vehicle that is hingedly mounted on the vehicle roof. U.S. Pat. No. 5,102,186 discloses a rear deck structure for a car for partly supporting a rear window glass elements and connecting opposite side walls of the car.

There remains a need for a movable vehicle body panel which is lightweight, has the desired degree of structural strength and rigidity, and which is an economical. replacement for steel and/or thermoplastic body panels.

SUMMARY OF THE INVENTION

This invention has met the hereinbefore described needs.

This invention provides a movable body panel for a vehicle. The body panel includes a load beating frame member having at least one elongated, generally hollow beam member. The frame member has a top side and an underside. At least one inner panel is secured to the underside of the frame member. At least one outer panel is positioned over the top side of the frame member. Each outer panel is positioned generally opposite at least a portion of at least one inner panel with a portion of the frame member disposed therebetween and is secured to one or more inner panels. Hinge means are provided for movably connecting the frame member to the vehicle. The hinge means permits movement of the body panel relative to the remainder of the vehicle. This permits the body panel to assume an open position, providing access to the interior of the vehicle from the exterior of the vehicle, and a closed position.

In a preferred embodiment, at least one of the beam members, inner panels and outer panels are made of aluminum. The beam members are preferably aluminum extrusions.

The method of this invention includes providing at least one elongated, generally hollow beam member. The beam member is formed into a load bearing frame member having a top side and an underside. The method further includes securing at least one inner panel to the underside of the frame member. At least one outer panel is positioned over at least a portion of the top side of the frame so that at least a portion of the outer panel is generally coextensive with at least a portion of at least one inner panel with the frame member disposed therebetween and secured to the panels. Hinge means are secured to a portion of the frame member and to the vehicle to connect the body panel to the vehicle and permit movement of the body panel relative to the remainder of the vehicle to established open and closed positions.

It is an object of this invention to provide a movable body panel for a vehicle.

It is another object of this invention to provide a body panel having lighter weight than a comparably sized conventional body panel made of traditional materials.

It is yet another object of this invention to provide a body panel for a vehicle that utilizes extrusions as the main load bearing members.

It is another object of this invention to provide a vehicle body panel which is constructed at least partially of aluminum.

It is yet another object of this invention to provide a movable body panel for a vehicle and a method of making such a body panel in which the ratio of the cost of the panel to weight saved is such as to make it an economically attractive alternative to conventional body panels.

These and other objects of the invention will be readily apparent from the following description of a preferred embodiment on reference to the drawings.

BRIEF DESCRIPTION OF THE DRAWINGS

FIG. 4 is longitudinal cross-sectional view of the body panel of FIG. 2 taken through line 4—4.

FIG. 5 is a transverse cross-sectional view of the body panel of FIG. 2 taken through line 5—5.

DETAILED DESCRIPTION OF PREFERRED EMBODIMENTS

Figure 1:
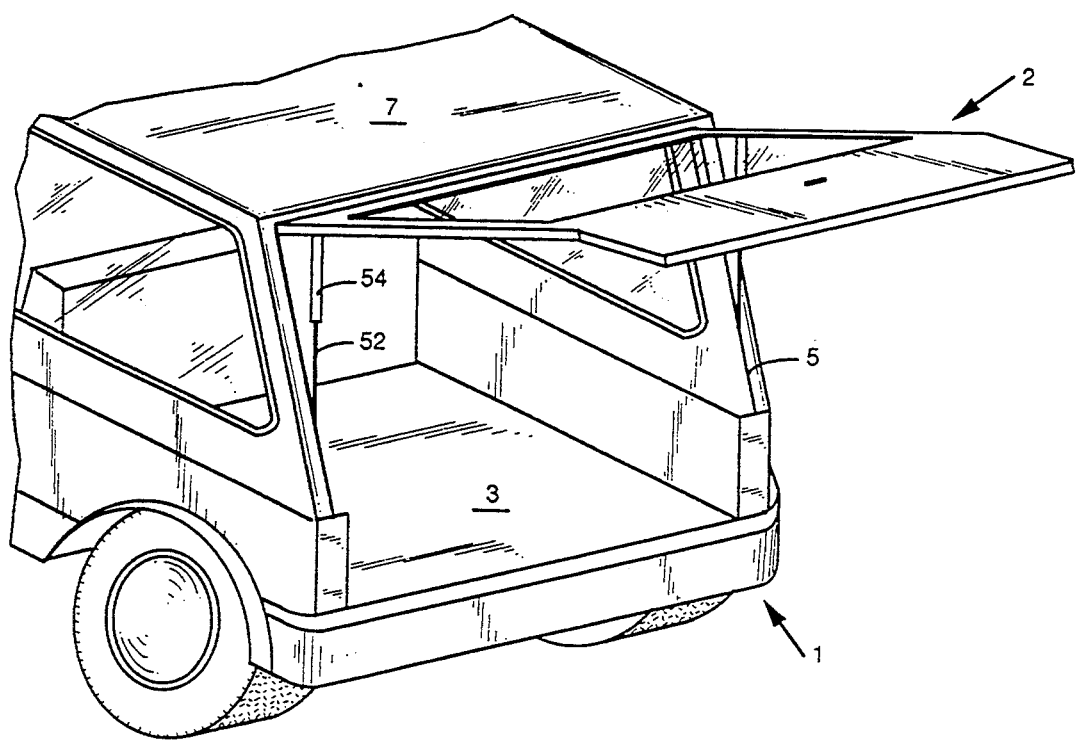
FIG. 1 is a partial perspective view showing a vehicle having a movable body panel of this invention.

Referring to FIG. 1, there is shown a motor vehicle 1. Vehicle 1 is shown in the form of a van. Vehicle 1 has a movable body panel 2 operatively associated with a rear opening 3 formed in vehicle 1. Opening 3 is defined by door frame 5. In FIG. 1, body panel 2 is shown in an open position. In a preferred embodiment, body panel 2 is a movable liftgate, which in an open position is disposed at a higher elevation than when in a closed position. As shown if FIG. 1, a major portion of body panel 2 is at or above the level of the top of vehicle 1. It will be appreciated, however, that body panel 2 may be a door, a trunk lid, a hatch, a hood or the like.

Referring to FIGS. 2 through 5, body panel 2 includes a load bearing frame member 4 having at least one elongated, generally hollow beam member 6. In a preferred embodiment, frame member 4 is generally U-shaped having a base 8 with generally parallel legs 10, 12 connected to the ends thereof. Frame member 4 has a top side 14 and an underside 16. In a preferred embodiment, frame member 4 is made of a single, elongated beam member 6 which is formed into a generally U-shaped structure. It will be appreciated, however, that frame member 4 may be made by joining more than one beam member 6. Beam member 6 is preferably a metal extrusion having a generally rectangular cross-sectional shape and a generally continuous outer wall 18 (FIG. 4). It will be appreciated, however, that outer wall 18 need not be continuous. The cross-sectional configuration is preferably, but not necessarily, substantially constant throughout the length of beam member 6. The rectangular cross-section of frame member 4 is preferably about 1 to 4 inches high and about 1 to 5 inches wide. The thickness of outer wall 18 is preferably about 0.040 to 0.125 inches. Beam member 6 is preferably made of aluminum. In a preferred embodiment, the aluminum alloys would include 6061 or 6063. It will be appreciated, however, that any suitable extrudable material may be used. Beam member 6 is preferably formed in T4 temper and artificially aged to T6 temper.

Beam member 6 may be formed into frame member 4 using hydro forming, or by other known forming processes. Frame member 4 may be formed to generally conform to the contours of the vehicle and/or vehicle opening as defined by body styling.

Figure 3:
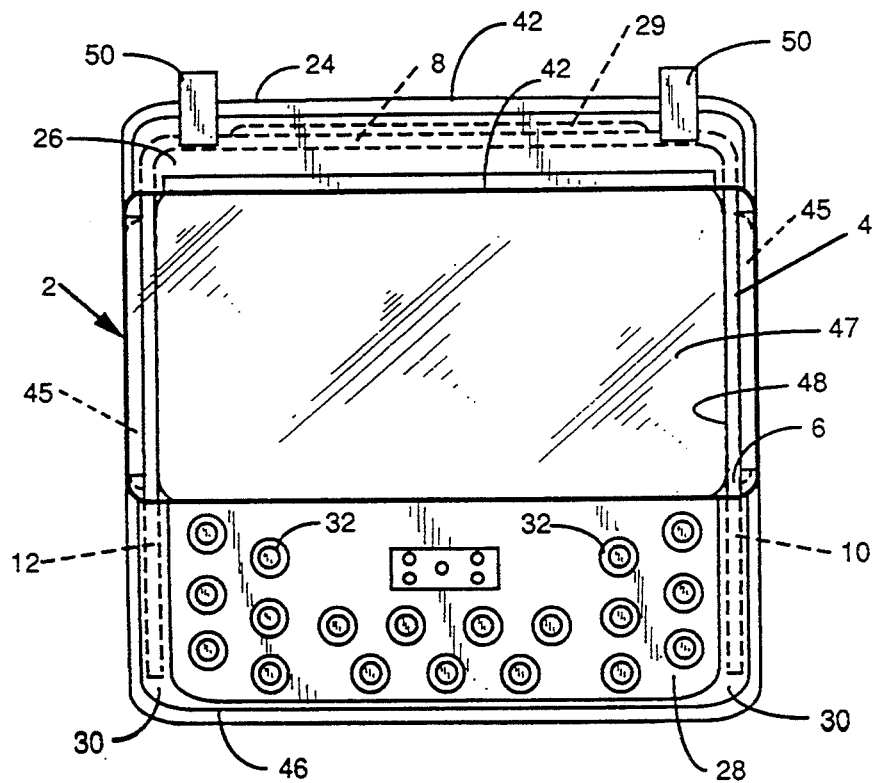
FIG. 3 is a bottom plan view of a body panel of this invention.
Figure 6A:
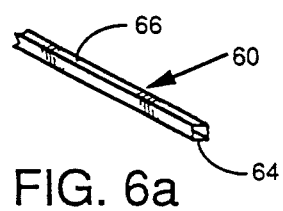
FIGS. 6a–6e are schematic sequential views showing a preferred embodiment of the method constructing the movable body panel of this invention.
Figure 6B:
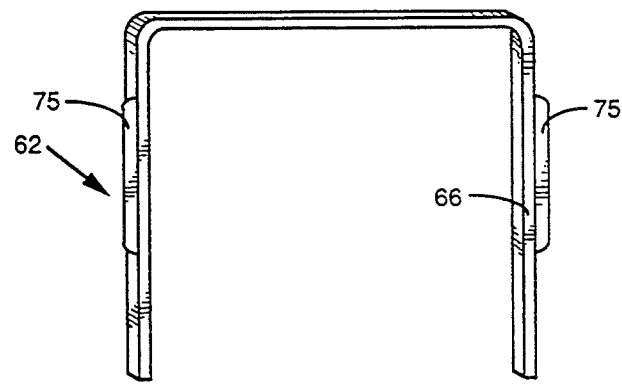
Figure 6C:
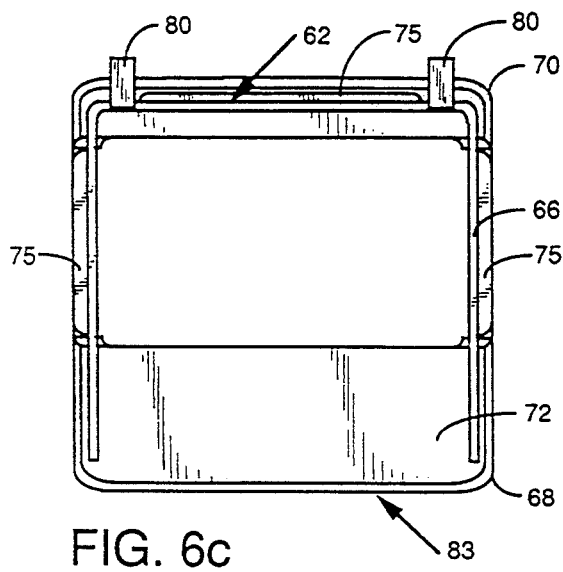
Figure 6D:
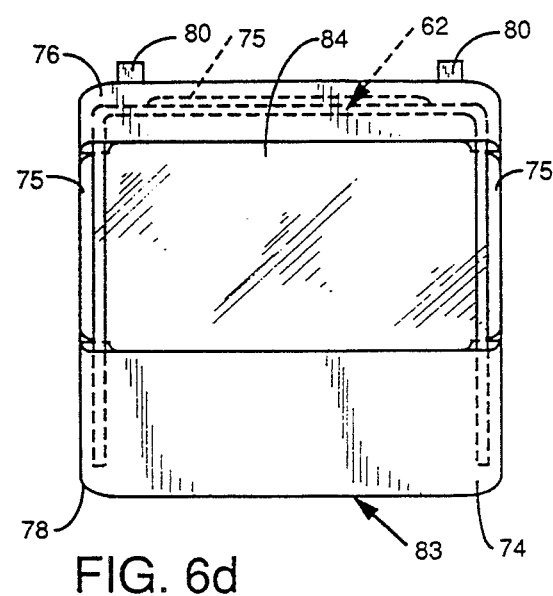
Figure 6E:
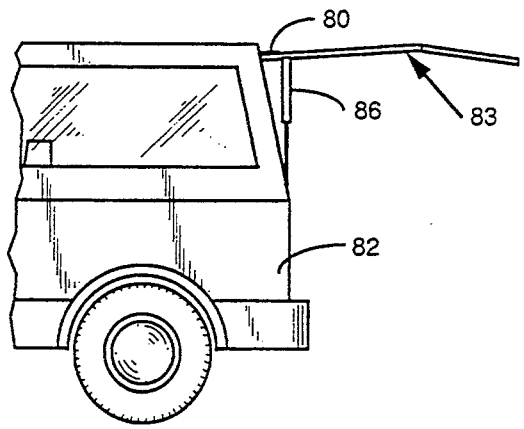

As shown in FIGS. 3-5, a first upper inner panel 24 is secured to underside 16 of a portion of frame member 4 at and adjacent to base 8 of frame member 4 and is positioned to extend between and slightly therebeyond legs 10, 12 of frame member 4. First inner panel 24 includes generally U-shaped recessed portion 26 (FIG. 4) within which base 8 and upper portions of legs 10, 12 of frame member 4 are received.

A second inner panel 28 is secured to an underside of a portion of frame member 4 spaced from base 8 to frame member 4 and positioned to extend between and slightly therebeyond legs 10, 12. Second inner panel 28 includes generally U-shaped recessed portion 30 (FIG. 5) within which portions of legs 10, 12 of frame member 4 are received. Inner panels 24 and 28 are preferably secured to frame member 4 using welding, mechanical fasteners or any other suitable means known to those skilled in the art.

As shown in FIGS. 3 and 4, at least one of inner panels 24, 28 may be provided with a plurality of relatively spaced reinforcing indentations 32 to provide additional rigidity to the panels. Each reinforcing indentation 32 is preferably in the shape of a truncated cone, and may be integrally formed into panels 24, 28 using any suitable means known to those skilled in the art. Suitable reinforcing indentations are disclosed in U.S. patent application Ser. No. 07/868,970, filed Apr. 16, 1992, which is specifically incorporated herein by reference.

A first outer panel 40 (FIGS. 2, 4-5) is positioned over top side 14 of frame member 4 generally opposite first inner panel 24 with frame member 4 disposed therebetween. First outer panel 40 is preferably secured to first inner panel 24. First inner panel 24 preferably has flanges 42 thereon positioned to abut the underside of first outer panel 40. Flanges 42 may be secured to first outer panel 40 using mechanical hemming with adhesive, as shown in FIGS. 4 and 5. Alternatively, the components may be connected to one another using welding, mechanical fasteners or any other suitable means known to those skilled in the art. Frame member 4 may be provided with flanges 29 which may be utilized to further facilitate connection of first outer panel 40 to frame member 4 and first inner panel 24. Flange 29 may be connected to first outer panel 40 by adhesive, welding, mechanical fasteners or any other suitable means known to those skilled in the art.

A second outer panel 44 is positioned over top side 14 of frame member 4 generally opposite second inner panel 28 with frame member 4 disposed therebetween. Second outer panel 44 is secured to second inner panel 28 and may also be secured to frame member 4. Second inner panel 28 preferably includes flanges 46 positioned to abut the underside of second outer panel 44. Flanges 46 may be secured to second outer panel 44 using mechanical hemming with adhesive, as shown in FIGS. 4 and 5. Alternatively, the components may be secured to one another using adhesive, welding, mechanical fasteners or any other suitable means known to those skilled in the art. Flanges 45 on frame member 4 may be positioned to engage second outer panel 44, further facilitating connection thereof to frame member 4.

Inner panels 24 and 28 may be secured to frame member 4 using welding, mechanical fasteners, or any other manner known to those skilled in the art. In a preferred embodiment, panels 24, 28 and 40, 44 are made of aluminum sheet having a thickness of about 0.028 to 0.036 inches. Preferred aluminum alloys include 6111 and 2008, with each formed in T4 temper and artificially aged to T6 temper. Alternatively, 5000 series alloys may be used. It will be appreciated, however, that any suitable material may be used.

Preferably, panels 24, 40 and panels 28, 44 are relatively positioned to define a window opening 48 extending through body panel 2. Glass, plexiglass or other suitable transparent or translucent material 47 may be positioned in window opening 48 to provide a window in panel 2. The use of multiple panels with a frame member reduces the amount of the material that is wasted as compared with conventional window openings. Conventional body panels which include window openings require removal of material from the body panels. The removed material is scrapped. With this invention, the panels are individually formed and positioned so that no material is wasted to form the window opening Outer panels 40, 44 form the exterior surface of body panel 2 and may be painted or otherwise finished, as desired, to provide a decorative appearance. Decorative panels may be provided to cover inner panels 24, 28 so that inner panels 24, 28 are not normally visible.

Figure 2:
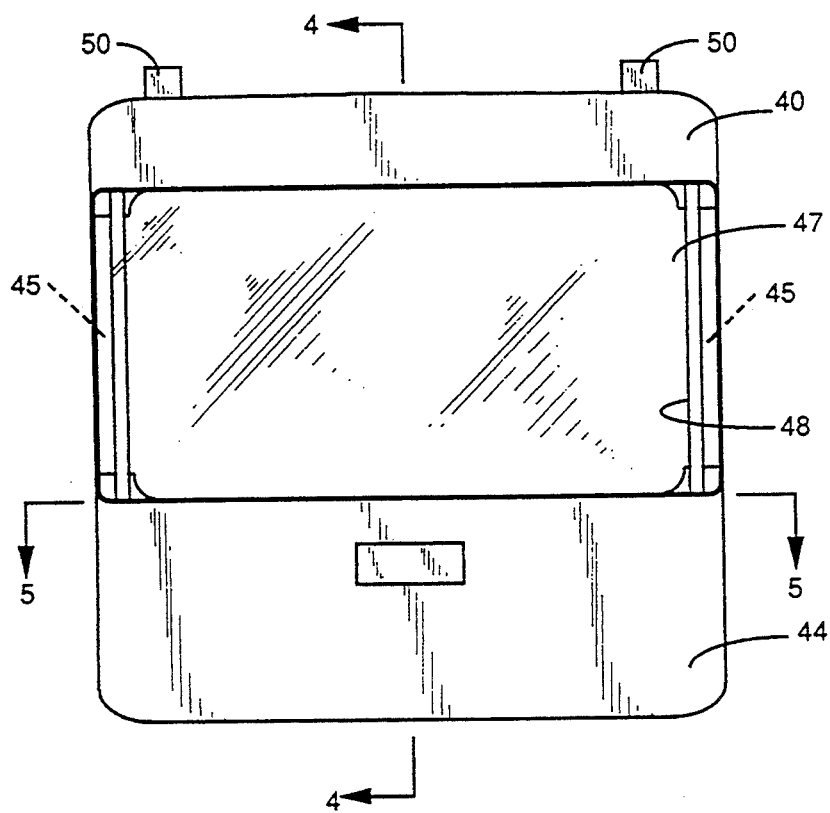
FIG. 2 is a top plan view of a body panel of this invention.

Referring to FIGS. 1-3, hinge means 50 are secured to a portion of frame member 4 and to vehicle 1 for movably mounting connecting body panel 2 to vehicle 1. Referring to FIG. 1, hinge means 50 permits movement of the body panel relative to the remainder of vehicle 1 between an open position and a closed position. Hinge means 50 may also be secured to first inner panel 24.

As shown in FIG. 1, body panel lift assist means 52 may be connected to frame member 4 and to vehicle 1 to regulate movement of body panel 2 about hinge means 50. In a preferred embodiment, lift assist means 52 includes at least one pneumatic cylinder 54. One end of cylinder 54 is secured to door frame 5 of vehicle 1 and another end of cylinder 54 is secured to frame member 4. It will be appreciated that any suitable lift assist means which are known to those skilled in the art may be used.

Referring now to FIGS. 6a–6e, the method of this invention includes providing at least one elongated, generally hollow beam member 60. Beam member 60 is formed into a load bearing frame member 62 having an underside 64 and a top side 66. Frame member 62 may be formed from an elongated extrusion using hydroforming processes or other suitable means known to those skilled in the art. Hydroforming or other suitable means known to those skilled in the art may also be used to form the frame member 62 to conform to the contours of the vehicle and vehicle opening. At least one inner panel 68 is secured to underside 64 of frame member 62. In a preferred embodiment, a first inner panel 70 and a second inner panel 72 are secured to frame member 62.

At least one outer panel 74 is positioned over at least a portion of top side 66 of frame member 62 so that at least a portion thereof is coextensive with at least a portion of at least one inner panel 68, with frame member 62 disposed therebetween. Outer panel 74 is secured to inner panel 68. In a preferred embodiment, first outer panel 76 is positioned generally coextensively with first inner panel 70 and is secured thereto, and second outer panel 78 is positioned generally coextensively with second inner panel 72 and is secured thereto. Hinge means 80 are secured to frame member 62 to connect the body panel 62 to a vehicle 82. Hinge means 80 permits movement of body panel 83 relative to the remainder of vehicle 82 to provide open and closed positions.

In a preferred embodiment, the provided beam member 60 has a generally rectangular cross-sectional shape with a generally continuous outer wall. Beam member 60 is preferably a metal extrusion made of aluminum. Panels 70, 72 and 76, 78 are preferably made of sheet aluminum as discussed hereinbefore.

In a preferred embodiment, the method includes relatively positioning panels 70, 72 and 76, 78 to provide a window opening 84 through body panel 83. Glass or other transparent or translucent material may be secured in opening 84 to provide a window.

Preferably, the method includes forming flanges on inner panels 68. The flanges are positioned to abut the underside of outer panel 74. Flanges 75 may also be provided on frame member 62. Flanges 75 may be positioned to engage outer panel 74 and further facilitate connection of frame member 62 to outer panel 74 and inner panel 68. Generally U-shaped recessed portions are preferably formed into inner panel 68 within which frame member 62 is received. Inner panels 68 are preferably secured to outer panels 74 using mechanical hemming and adhesive, as shown in FIGS. 4 and 5. Alternatively, the components may be secured to one another using welding, mechanical fastening or any other suitable means known to those skilled in the art. Likewise, inner panels 68 are secured to frame member 62 using adhesive, welding, mechanical fastening or any other suitable means known to those skilled in the art.

Referring again to FIGS. 6a–6e, the method may also include providing lift assist means 86 to regulate movement of body panel 83 about hinge means 80.

At least one of inner panels 68 may be provided with reinforcing indentations integrally formed therein to provide increased rigidity of the panel.

It will be appreciated that this invention provides a movable body panel which is lightweight, has a desired level of structural strength and rigidity, and which is an economical replacement for body panels made of steel and/or thermoplastic materials. This invention also provides a method of making such a body panel.

While for simplicity of disclosure, a frame member of generally U-shaped configuration has been illustrated, the invention is not so limited. For example, the frame member could be a pair of "L" shaped frame members joined together at their shorter leg. In addition, the outer wall of the frame member need not be continuous. Other configurations may be dictated by the end use objectives. In addition, the frame member may be made from a single beam member or by joining several beam members.

For clarity of disclosure, the terms "underside" and "top side" have been used. Such terms are not limitations on the invention.

Whereas particular embodiments of this invention have been described for purposes of illustration, it will be evident to those skilled in the art that numerous variations may be made without departing from the invention as defined in the following claims.

What is claimed is:

1. A movable body panel for a vehicle comprising:
   a load bearing frame member having at least one elongated beam member having a generally hollow portion defined by at least one generally continuous wall;
   said frame member having a top side, at least one flange and an underside;
   at least one inner panel secured to the underside of said frame member, said inner panel having at least one flange;
   at least one outer panel positioned over the top side of said frame member to engage said flange of said frame member and positioned generally opposite and secured to at least a portion of at least one said flange of said inner panel with said frame member disposed between at least a portion of said inner and outer panels; and
   hinge means secured to said frame member for connecting said frame member to the vehicle for permitting movement of said body panel relative to the remainder of the vehicle.

2. The body panel of claim 1, wherein each said beam member is generally rectangular in cross-sectional shape.

3. The body panel of claim 1, wherein each said inner panel includes a recessed portion within which at least a portion of said frame member is received.

4. The body panel of claim 1, wherein said body panel is a liftgate.

5. The body panel of claim 1, wherein at least one said inner panel includes a plurality of spaced integrally formed reinforcing indentations therein.

6. The body panel of claim 1, wherein at least one said beam member is an extrusion.

7. The body panel of claim 1, wherein at least one of said beam member, said inner panel and said outer panel is composed of aluminum.

8. The body panel of claim 1, further comprising body panel movement assist means connected to said frame member for regulating movement of the body panel about said hinge means.

9. The body panel of claim 1, wherein said body panel is a trunk lid.

10. The body panel of claim 1, wherein said body panel is a hatch.

11. The body panel of claim 1, wherein said body panel is a hood.

12. The body panel of claim 1, wherein said body panel is a door.

13. The body panel of claim 1, wherein said inner panels and said outer panels are relatively positioned to define a window opening extending through said body panel.

14. A vehicle having a movable body panel, said movable body panel comprising:
- a load bearing generally U-shaped frame member made of at least one elongated beam member having a hollow portion defined by at least one generally continuous wall a base and two generally parallel legs; said frame member further having a top side and an underside;
- a first inner panel secured to a portion of said underside of said frame member; a second inner panel positioned adjacent to said first inner panel and secured to a portion of said frame member;
- a first outer panel positioned over the top side of said frame member and positioned generally opposite and secured to said first inner panel with said frame member disposed therebetween;
- a second outer panel positioned over the top side of said frame member and positioned generally opposite and secured to said second inner panel with said frame member disposed therebetween;
- said beam, member further includes at least one flange positioned to engage at least one of said outer panels;
- said first inner panel includes at least one flange abutting an underside of said first outer panel; and
- said second inner panel includes at least one flange abutting an underside of said second outer panel, and
- hinge means for connecting said frame member to the vehicle and permitting movement of said body panel relative to the remainder of the vehicle.

15. The vehicle of claim 14, wherein said first inner panel includes a recessed portion within which said base of said frame member and at least a portion of each said leg of said frame member is received; and
said second inner panel includes a recessed portion within which at least a potion of said legs of said frame member are received.

16. A vehicle having a movable body panel, said body panel comprising:
- a load bearing generally U-shaped frame member made of at least one elongated generally hollow beam member and having a base and two generally parallel legs; said frame member having a top side and an underside;
- a first inner panel secured to a portion of said underside of said frame member;
- a second inner panel positioned adjacent to saint first inner panel and secured to a portion of said frame member; a first outer panel positioned over the top side of said frame member and positioned generally opposite and secured to said first inner panel with said frame member disposed therebetween;
- a second outer panel positioned over the top side of said frame member and positioned generally opposite and secured to said second inner panel with said frame member disposed therebetween;
- hinge means for connecting said frame member to the vehicle and permitting movement of said body panel relative to the remainder of the vehicle;
- said first inner panel includes a recessed portion within which said base of said frame member and at least a portion of each said leg of said frame member is received;
- said second inner panel includes a recessed portion within which at least a portion of said legs of said frame member are received;
- said beam member includes at least one flange positioned to engage at least one said outer panels;
- said first inner panel includes at least one flange abutting an underside of said first outer panel; and
- said second inner panel includes at least one flange abutting an underside of said second outer panel.

17. The vehicle of claim 16, wherein said frame member is a metal extrusion.

18. The vehicle of claim 17, wherein at least one of said frame member, said inner panels and said outer panels is composed of aluminum.

19. A method of making a body panel for a vehicle which includes the steps of:
- providing at least one elongated beam member having a hollow portion defined by at least one generally continuous wall;
- providing said beam member as a load bearing frame member having a top side at least one flange and an underside;
- securing at least one inner panel having at least one flange thereon to said underside of said frame member;
- positioning at least one outer panel over at least a portion of said top side of said frame member so that said outer panel is generally coextensive with at least a portion of at least one said inner panel with said frame member disposed therebetween and so that said flanges of said beam member and said inner panel engage said outer panel;
- securing said outer panel to at least one flange of said frame member and at least one said flange of at least one said inner panel; and
- securing hinge means to a portion of said frame member and to the vehicle to permit movement of said panel relative to the remainder of the vehicle.

20. The method of claim 19, further including positioning said inner panels and said outer panels to provide a window opening extending through the body panel.

21. The method of claim 20, further including positioning a window in said window opening.

22. The method of claim 19, further including providing said beam member having a generally rectangular cross-sectional shape.

23. The method of claim 22, further including forming at least one recessed portion in said inner panel into which at least a portion of said frame member is received.

24. The method of claim 23, further including forming a plurality of spaced reinforcing indentations in at least a portion of at least one said inner panel.

25. The method of claim 24, further including forming said beam member from a metal extrusion.

26. The method of claim 24, further including forming said frame member by bending said metal extrusion.

27. The method of claim 26, further including providing body panel movement assist means connected to said frame member for regulating movement of said body panel about said hinge means.

* * * * *

UNITED STATES PATENT AND TRADEMARK OFFICE
CERTIFICATE OF CORRECTION

PATENT NO. : 5,449,213
DATED : September 12, 1995
INVENTOR(S) : Matthew P. Kiley et al.

It is certified that error appears in the above-indentified patent and that said Letters Patent is hereby corrected as shown below:

Col. 7, claim 14, line 20         Insert a comma after "wall"

Col. 7, claim 15, line 50         Delete "potion", and insert --portion-- after "a"

Col. 7, claim 16, line 61         Delete "saint", and insert --said-- before "first"

Col. 8, claim 19, line 28         Insert a comma after "side"

Signed and Sealed this

Eleventh Day of February, 1997

*Attest:*

BRUCE LEHMAN

*Attesting Officer*        *Commissioner of Patents and Trademarks*